July 8, 1930.   P. F. HOWSE   1,770,136
HEADLAMP OF MOTOR ROAD VEHICLES
Filed Aug. 8, 1928   2 Sheets-Sheet 1

Percival Francis Howse
INVENTOR:
By [signature]
his Attorney.

Patented July 8, 1930

1,770,136

UNITED STATES PATENT OFFICE

PERCIVAL FRANCIS HOWSE, OF CLONCURRY, QUEENSLAND, AUSTRALIA

HEADLAMP OF MOTOR ROAD VEHICLES

Application filed August 8, 1928, Serial No. 298,201, and in Australia January 12, 1928.

This invention relates to headlamps of motor-road vehicles and refers particularly to means adapted to permit the headlamps to move in a direction corresponding with the direction in which the front wheels of the vehicle are moving when the vehicle is being turned around corners.

Figure 1:
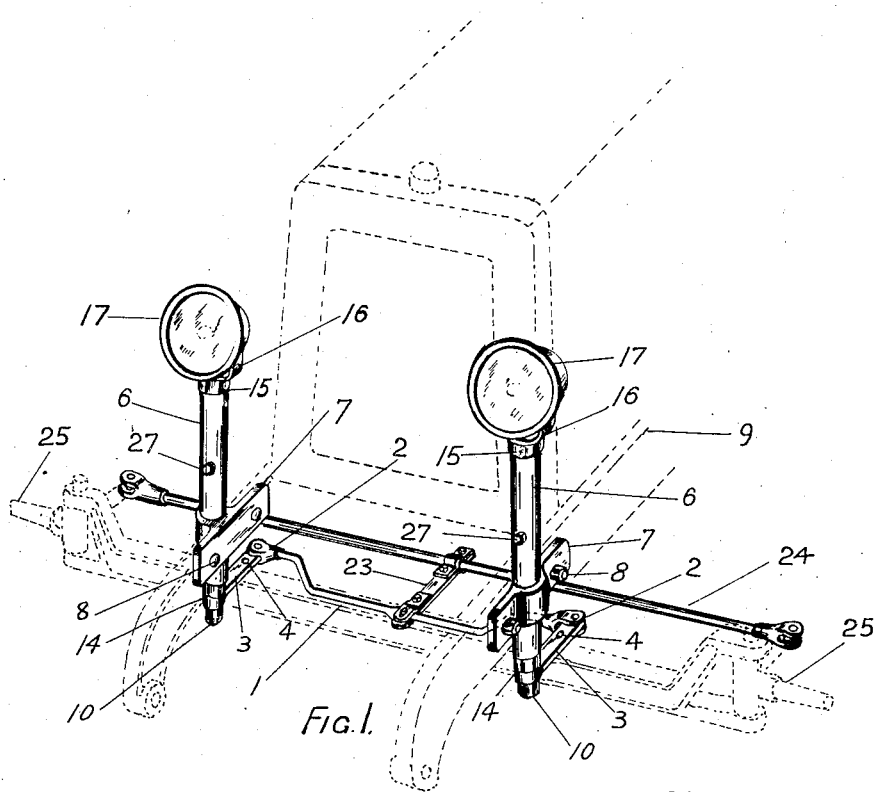
Figure 2:
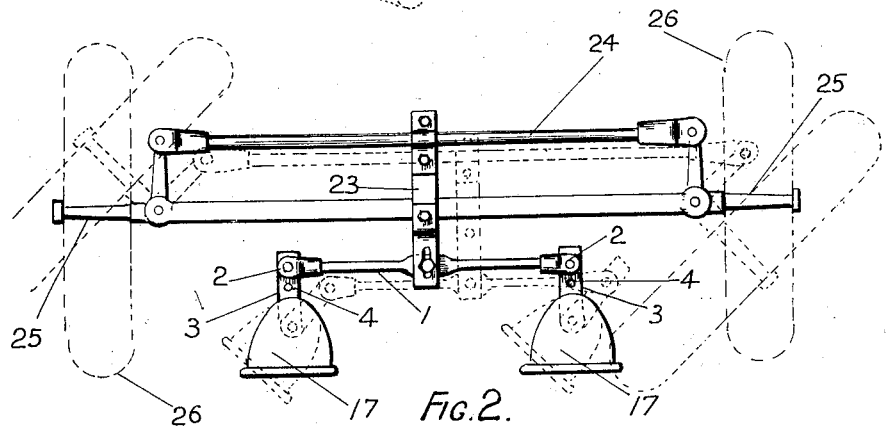
Figure 3:
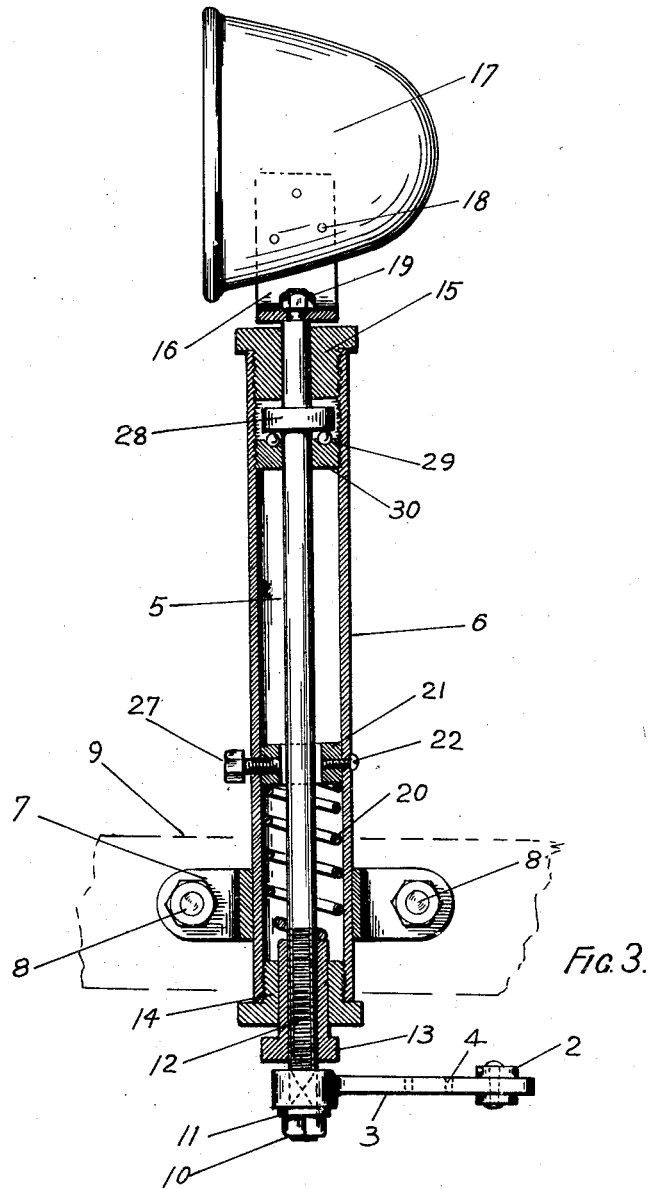

Referring to the accompanying drawings, in which the invention is illustrated, Fig. 1 is a perspective view of the headlamp turning means associated with the front of a motor-road vehicle; Fig. 2 plan view of such means showing relative movement of the headlamps with the movement of the front wheels of the vehicle when the latter is being turned to right hand direction; and Fig. 3 sectional elevational view of lamp pillar with associable elements.

A rod 1 is provided which is crank bent at its opposite ends and forked at 2 at such ends to be connected by bolts or otherwise to plates 3 which have a series of openings 4, the forked ends 2 of the rod 1 being attachable to such plates 3 through the openings 4. Said plates 3 are also attached to pillars 5 which pass through tubes 6 which are fastenable through brackets 7 and associable bolts and nuts 8 with the chassis 9 of the vehicle.

Said pillars 5 may be squared at one end to receive the plates 3 and tightening nuts 10 and washers 11 may be utilized for securing the plates 3 to the pillars 5. The lower end of the pillars 5 is screw-threaded as at 12 and is adapted to pass through tapped bushings 13 which fit bottom screw-caps 14 adapted to be removably fitted to the foot of the tubes 6. Such bushings 13 project into the tubes 6. At the head of the tubes 6 are also screw-caps 15 which are holed to permit the pillars 5 to pass therethrough. A collar 28 may be provided on each of the pillars 5 and when the latter are assembled in the tubes 6 such collars may form one bearing face for ball bearings 29, another bearing face 30 for the ball bearings 29 being located within the tubes 6 below the said collars 28.

At the head of the pillars 5 clamp plates 16 are located to which the headlamps 17 are attachable by rivets 18 or otherwise; the clamp plates 16 may be secured to the pillars 5 by the nuts 19.

Within each of the tubes 6 is located a coil spring 20 which surrounds the separate pillars 5 located within such tubes. The bushings 13 serve as an abutment for one end of said springs 20 and the other end of the springs 20 is adapted to abut an element 21 secured by screws 22 within said tubes 6. By turning the bushings 13 the tension of the springs 20 may be adjusted.

The rod 1 may be holed to receive a bolt or the like passing through one end of a plate 23 whose other end is suitably attached to the connecting rod 24 for the stub axles 25 of the front wheels 26 of the motor road vehicle. Such plate 23 is situated centrally of the rod 1 in its attachment to the connecting rod 24, and the said plate has an elongated opening 35 therein whereby upon right or left movement of the rod 24 corresponding movement of the rod 1 can also be effectuated.

If desired a pinching screw 27 may be provided in association with the tubes 6 and elements 21 therein whereby the pillars 5 may be held stationary when the plates 3 are disconnected from the rod 1.

In operation, when the vehicle is being steered to either left or right hand direction the rod 1 will be moved in correspondence with the movements imparted to the connecting rod 24 of the stub axles 25 of the front wheels 26 and consequently the plates 3, the pillars 5 and the headlamps 17 at the opposite ends of the rod 1 will simultaneously be moved. Any vibration of the headlamps 17 will be compensated for by the coil springs 20 surrounding the pillars 5 and situated within the tubes 6 which are supported in the brackets 7 attached to the vehicle.

What I claim as my invention and desire to secure by Letters Patent is:—

1. In a device of the character described, the combination with the chassis frame of an automobile and its steering rod, of an upright lamp supporting tubular posts, brackets attached to the chassis frame for carrying the posts, bearing blocks screwed into opposite ends of posts, an axially movable bushing in the bore of each block at the lower ends of the posts, a spring to compensate for vibration in the device yieldably urging each bushing downwardly, a fixed collar in each post to form a seat for the upper end of the spring, a ball race fixed in each post adjacent the upper end, a spindle rotatably mounted in the bearing block and bushing of each post and having an enlarged portion supported on the ball race, and a threaded lower end screwed in the bushing, a lamp casing mounted on the end of the spindle projecting above the upper bearing block, a radial arm turning with each spindle and attached to the lower end thereof projecting below the bushing, a link having raised ends pivotally connected to the radial arm of each spindle, and a rigid connecting piece pivotally mounted at one end on the mid portion of the link and rigidly attached at its other end to the mid portion of the steering rod.

2. A device as claimed in claim 1, in which the radial arm of each spindle is provided with spaced openings to accommodate the ends of the link in adjusted positions.

In testimony whereof I affix my signature.

PERCIVAL FRANCIS HOWSE.